(12) United States Patent
Mack et al.

(10) Patent No.: US 6,710,558 B1
(45) Date of Patent: Mar. 23, 2004

(54) ELECTRONICALLY COMMUTABLE MOTOR, IN PARTICULAR, FOR A LIQUID PUMP

(75) Inventors: Rolf Mack, Sinzheim (DE); Stefan Koch, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,417

(22) PCT Filed: Apr. 20, 2000

(86) PCT No.: PCT/DE00/01236

§ 371 (c)(1),
(2), (4) Date: May 17, 2002

(87) PCT Pub. No.: WO00/67368

PCT Pub. Date: Nov. 9, 2000

(30) Foreign Application Priority Data

Apr. 29, 1999 (DE) .......................... 199 19 462

(51) Int. Cl.[7] .............. H02P 5/06; H02P 3/00
(52) U.S. Cl. ............ 318/254; 318/268; 318/471; 318/811
(58) Field of Search .............. 318/471–473, 318/811, 254, 268

(56) References Cited

U.S. PATENT DOCUMENTS

| | | | |
|---|---|---|---|
| 4,961,037 A | | 10/1990 | Orii et al. |
| 5,023,531 A | * | 6/1991 | Altemose et al. ............ 318/471 |
| 5,784,232 A | * | 7/1998 | Farr .............................. 361/22 |
| 5,808,441 A | * | 9/1998 | Nehring ....................... 318/751 |
| 5,828,200 A | * | 10/1998 | Ligman et al. ............. 318/807 |
| 5,942,866 A | | 8/1999 | Hsieh |
| 5,952,803 A | * | 9/1999 | Canada et al. ............... 318/558 |
| 6,014,004 A | * | 1/2000 | Hamaoka et al. ........... 318/778 |
| 6,040,668 A | * | 3/2000 | Huynh et al. ................ 318/471 |
| 6,249,100 B1 | * | 6/2001 | Lange ......................... 318/471 |
| 6,528,987 B1 | * | 3/2003 | Blake et al. ................. 324/168 |

FOREIGN PATENT DOCUMENTS

| | | |
|---|---|---|
| DE | 21 17 639 | 10/1972 |
| DE | 196 30 036 | 1/1998 |
| GB | 2 260 785 | 4/1993 |

* cited by examiner

*Primary Examiner*—Robert Nappi
*Assistant Examiner*—Patrick Miller
(74) *Attorney, Agent, or Firm*—Kenyon & Kenyon

(57) ABSTRACT

An electronically commutatable motor, in particular for a fluid pump, includes excitation windings that may be connected to and disconnected from a DC supply voltage via semiconductor switches that are controlled by control signals of a commutation device. Additional closed- and/or open-loop control of the output of the motor, is obtained with a temperature protection system in that the control signals of the commutation device are clocked by pulse width modulatable output signals of a PWM generator and in that the pulse width ratio of the output signals of the PWM generator may additionally be modified as a function of the output signal of the temperature sensor.

5 Claims, 1 Drawing Sheet

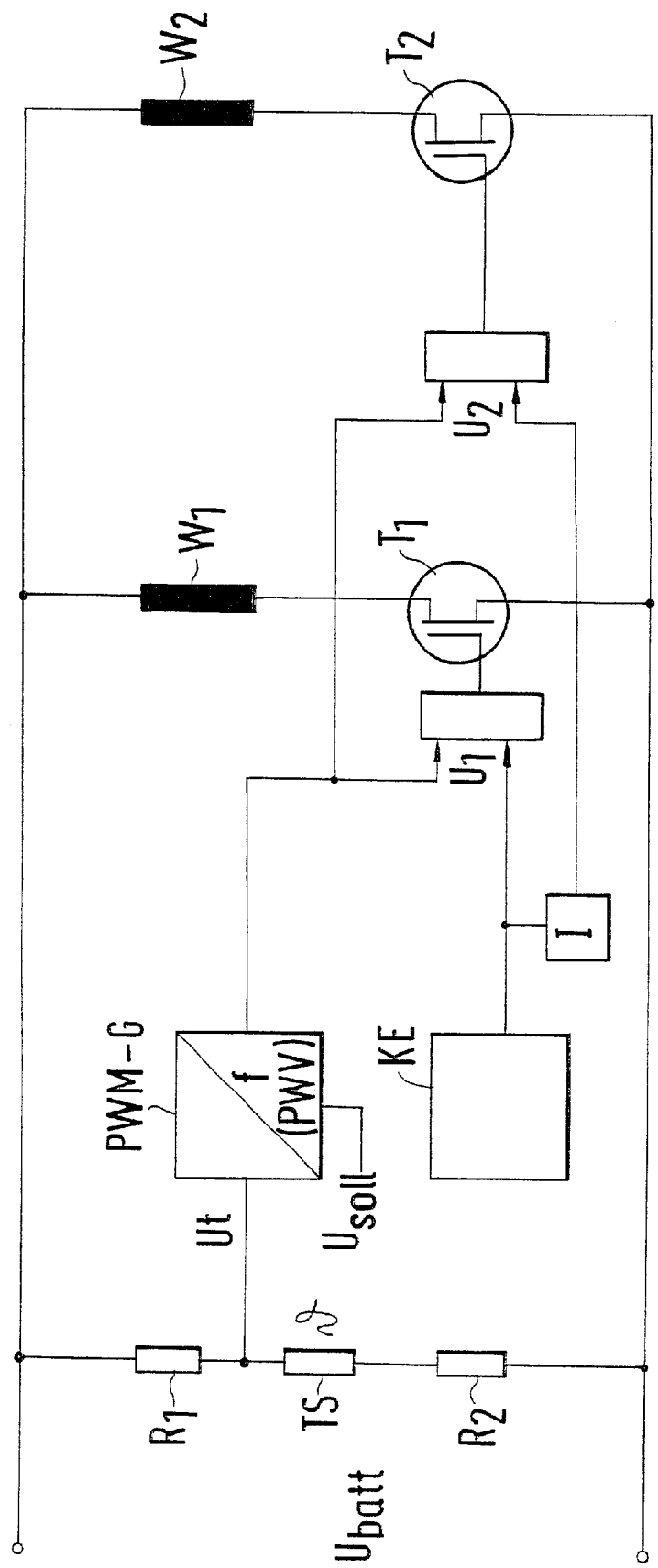

ELECTRONICALLY COMMUTABLE MOTOR, IN PARTICULAR, FOR A LIQUID PUMP

FIELD OF THE INVENTION

The invention relates to an electronically commutatable motor, in particular for a fluid pump, in which the excitation windings may be connected to a DC supply voltage and disconnected therefrom via semiconductor switches controlled by control signals of a commutation device, and in which the control signals of the commutation device are clocked by pulse width modulatable output signals of a PWM generator, the pulse width ratio of which may additionally be modified as a function of the output signal of the temperature sensor.

BACKGROUND INFORMATION

A motor of this kind is described in U.K. Published Patent Application NO. 2 260 785. The motor drives a fan. In that context, the ambient temperature in a room is measured and is compared to a defined temperature, for example, a desired room temperature. The two temperature values are compared to one another, and the comparison signal modifies the activation signal for the motor. The activation signal is generated by a PWM generator, and the pulse width ratio is modified as a function of the comparison signal. As described in German Published Patent Application No. 196 30 036 in the context of a control switch, the pulse width ratio can be defined with a first clock frequency up to a defined temperature value, and with a second, lower clock frequency when that temperature value is exceeded. This is intended to result in smaller dimensions for the cooling device of the control switch.

It is also conventional to switch off an electronically commutatable motor when a definable limit temperature is reached, as described in German Published Patent Application No. 21 17 639 in the context of a current-monitored motor. The motor current is directed through a temperature-dependent component.

It is an object of the invention to provide a motor in which the output signal of the temperature sensor may be used, in simple fashion, for a first operating state over a wide control range of delivery volumes of a fluid pump, and serves as a protective signal only in a critical terminal range.

SUMMARY

This object is achieved, according to the present invention, in that the temperature sensor monitors the temperature in the housing chamber of the fluid pump; in that up to a defined or definable temperature, the PWM generator operates with a defined or definable operating pulse width ratio; in that after that temperature is exceeded, the PWM generator modifies the pulse width ratio as a function of the output signal of the temperature sensor; and in that when a limit temperature in the housing chamber is reached, the output signal of the temperature sensor causes the motor to be switched off by way of the PWM generator.

If the temperature remains below the first defined or definable temperature value, control may then occur optimally in the control loop, with no risk of overmodulating the motor, until that temperature is reached. If the defined first temperature is exceeded, the motor then enters a critical operating range and is protected from overload by modification of the pulse width ratio of the activation signals. A further defined temperature value serves to switch off the motor if the modification of the pulse width ratio is insufficient to stabilize operation and the motor could in fact be overloaded. This guarantees reliable, safe, and optimal operation of the motor of a fluid pump up to a critical temperature value, in which context the influence of the delivered fluid volume on heating of the motor may be taken into account by the manner in which the pulse width ratio of the activation signals is modified.

The use of a PWM generator with a variable pulse width ratio makes it possible to control the output of the motor. The fluid flow not only may be predefined, but also is automatically coupled to the temperature sensed by the temperature sensor in the housing chamber, and may be modified as a function thereof. The dependence may be selected so that the pulse width ratio increases or decreases as the temperature in the housing chamber rises.

The fluid flow may increase with rising temperature and may be used for greater cooling of the motor. It is also possible, however, to reduce the output of the motor, and thus the fluid flow, as the temperature rises. This depends on the utilization of the motor and the operating conditions.

Only the PWM generator is required as an additional component for these additional functions of the motor.

According to one example embodiment of the present invention, the temperature-dependent output signal for the PWM generator may be derived from the fact that an NTC resistor incorporated into a voltage divider is usable as the temperature sensor, and a voltage drop that decreases with increasing temperature may be picked off at the voltage divider as the output signal, or by the fact that a PTC resistor incorporated into a voltage divider is used as the temperature sensor, and a voltage drop that increases with increasing temperature may be picked off at the voltage divider as the output signal.

Activation of the semiconductor switches with their excitation windings using pulse width modulated control signals is achieved in simple fashion by the fact that the control signals of the commutation device and the output signals of the PWM generator activate the semiconductor switches with the excitation windings by way of driver circuits equipped with AND circuits.

Temperature protection that may be extended to the electrical and electronic components is achieved by the fact that the electrical or electronic components necessary for operation of the motor are arranged on a circuit board that is also housed in the housing chamber.

BRIEF DESCRIPTION OF THE DRAWING

FIG. 1 is a circuit diagram of an example embodiment of a motor according to present invention.

DETAILED DESCRIPTION

In the example embodiment of the present invention illustrated in FIG. 1, the motor has two excitation windings W1 and W2, which may be connected to and disconnected from DC supply voltage Ubatt via semiconductor switches T1 and T2. Configuring the motor with a greater number of excitation windings simply requires further semiconductor switches and a different commutation device KE having the corresponding number of temporally offset control signals.

With the additional PWM generator PWM-G, it is possible to add high-frequency clock signals, the pulse width ratio PWV of which may be modified, by specifying a setpoint Usoll, in order to allow the output of the motor and thus the fluid flow to be controlled in open- and/or closed-loop fashion. The output signals of PWM generator PWM-G are all delivered to semiconductor switches T1 and T2 using driver circuits equipped with AND circuits U1 and U2. Only the semiconductor switch T1 or T2, the associated driver circuit of which is currently being activated by commutation device KE is switched through. As indicated by inverter section I, in the example embodiment, the two driver circuits are activated inversely.

Also delivered to PWM generator PWM-G is an output signal Ut of a temperature sensor TS, which is used for a further modification of the pulse width ratio PWV of PWM generator PWM-G.

A negative temperature coefficient (NTC) resistor or a positive temperature coefficient (PTC) resistor that is inserted into a voltage divider having resistors R1 and R2 is used as temperature sensor TS. At the voltage divider, a voltage drop that decreases or increases with increasing temperature in the housing chamber may be picked off as output signal Ut. Depending on requirements, the pulse width of the output signals of PWM generator PWM-G may increase or decrease as output signal Ut of temperature sensor TS increases. The same also applies to a decrease in output signal Ut of temperature sensor TS. The dependence is selectable and depends on the utilization of the motor and the operating conditions. Using temperature sensor TS, it is additionally possible not only to control the output in closed- or open-loop fashion as a function of a setpoint Usoll, but also to incorporate into the motor control system a temperature protection function that takes effect even during operation and in addition may be applied as a temperature protection system to switch off the motor if a limit temperature is exceeded.

The motor control system offers many possible variations in response to the temperature that is sensed. For example, the additional temperature-dependent modification of the pulse width ratio of PWM generator PWM-G may take effect, and increase or reduce the output of the motor, only above a defined or definable temperature. This type of motor control system is moreover applicable to any electronically commutatable motor arrangement. The motor may be configured not only as an internal-rotor motor but also as an external-rotor motor.

What is claimed is:

1. An electronically commutatable motor for a fluid pump, comprising:

a temperature sensor configured to monitor a temperature in a housing chamber of the fluid pump;

a commutation device;

semiconductor switches controlled by control signals of the commutation device;

excitation windings connectable to a DC supply voltage and disconnectable therefrom via the semiconductor switches; and a PWM generator, the control signals of the commutation device being clocked by pulse width modulatable output signals of the PWM generator, a pulse width ratio thereof being modifiable as a function of an output signal of the temperature sensor;

wherein the PWM generator is configured to operate with one of a defined and a definable operating pulse width ratio up to one of a defined and a definable temperature;

wherein the PWM generator is configured to modify the pulse width ratio as a function of the output signal of the temperature sensor after the one of the defined and the definable temperature is reached;

wherein the motor is configured to be switch off by way of the PWM generator in accordance with the output signal of the temperature sensor when a limit temperature in the housing chamber is reached; and wherein the pulse width ratio one of increases and decreases as the temperature in the housing chamber rises.

2. The electronically commutatable motor according to claim 1, wherein the temperature sensor includes a negative temperature coefficient (NTC) resistor incorporated into a voltage divider, the output signal including a voltage drop that decreases with increasing temperature being picked off at the voltage divider.

3. The electronically commutatable motor according to claim 1, wherein the temperature sensor includes a positive temperature coefficient (PTC) resistor incorporated into a voltage divider, the output signal including a voltage drop that increases with increasing temperature being picked off at the voltage divider.

4. The electronically commutatable motor according to claim 1, further comprising driving circuits including AND circuits, the control signal of the commutation device and the output signals of the PWM generator configured to activate the semiconductor switches with the excitation windings by way of the driver circuits.

5. The electronically commutatable motor according to claim 1, further comprising a circuit board housed in the housing chamber, one of electrical and electronic components necessary for operation of the motor being arranged on the circuit board.

* * * * *